United States Patent [19]

Henry et al.

[11] Patent Number: 5,093,876
[45] Date of Patent: Mar. 3, 1992

[54] WDM SYSTEMS INCORPORATING ADIABATIC REFLECTION FILTERS

[75] Inventors: Charles H. Henry; Rudolf F. Kazarinov, both of Somerset County; Yosi Shani, Aberdeen, all of N.J.

[73] Assignee: AT&T Bell Laboratories, Murray Hill, N.J.

[21] Appl. No.: 709,009

[22] Filed: May 31, 1991

Related U.S. Application Data

[62] Division of Ser. No. 559,010, Jul. 27, 1990, Pat. No. 5,048,909.

[51] Int. Cl.$^5$ .............................................. G02B 6/26
[52] U.S. Cl. ........................................ 385/28; 385/45; 385/47
[58] Field of Search .............. 350/96.15, 96.14, 96.13

[56] References Cited

U.S. PATENT DOCUMENTS

| | | | |
|---|---|---|---|
| 4,128,301 | 12/1978 | Burns et al. | 350/96.15 |
| 4,690,489 | 9/1987 | Neyer | 350/96.14 |
| 4,763,977 | 8/1988 | Kawasaki et al. | 350/96.15 |
| 4,775,207 | 10/1988 | Silberberg | 350/96.14 |

FOREIGN PATENT DOCUMENTS 0121404  6/1985  Japan.

OTHER PUBLICATIONS

D. C. Johnson et al., "New Design Concept for a Narrowband...", *Electronics Letters*, Jun. 18, 1987, vol. 23, No. 13, pp. 668–669.

R. C. Alferness et al., Electronic filling apparatus using part of read image information as retrieval information Narrowband GaInAsP/InP Waveguide Grating-Folded...", *Electronics Letters*, Feb. 4, 1988, vol. 23, No. 3, pp. 150–151.

R. F. Kazarinov et al., "Narrow-Band Resonant Optical Reflectors and Resonant...", IEEE Journal of Quantum Electronics, vol. QE-23, No. 9, Sep. 1987, pp. 1419–1425.

C. H. Henry et al., "A Narrow-Band $Si_3N_4$-$SiO_2$ Resonant Optical Reflector", *IEEE Journal of Quantum Electronics*, vol. QE-23, No. 9, Sep. 1987, pp. 1426–1428.

*Primary Examiner*—John D. Lee
*Assistant Examiner*—Stephen W. Barns
*Attorney, Agent, or Firm*—Michael J. Urbano

[57] ABSTRACT

A wavelength selective structure is coupled to an adiabatic Y-coupler via a multimode section which supports both symmetric and antisymmetric modes. One single mode branch of the coupler converts guided light to a symmetric mode, whereas the other single mode branch converts guided light to an anti-symmetric mode. The structure, which includes a pair of single mode waveguide arms coupled to the common section and a reflection device (such as a grating or ROR) located in each arm, converts reflected light from a symmetric mode to an anti-symmetric mode and conversely. Applications described include a channel dropping filter and channel balancing apparatus for WDM systems, and a dispersion compensator for fiber optic systems.

4 Claims, 3 Drawing Sheets

WDM SYSTEMS INCORPORATING ADIABATIC REFLECTION FILTERS

BACKGROUND OF THE INVENTION

This is a division of application Ser. No. 07/559,010 filed July 27, 1990 (U.S. Pat. No. 5,048,909).

This invention relates to optical apparatus which operates selectively on optical signals based on the frequency content of the signal. Illustratively, the invention relates to optical filters, channel balancers and dispersion compensators.

One architecture for optical transmission systems, known as wavelength division multiplexing (WDM), involves assigning a different wavelength to each of a plurality of signal channels. At certain terminals or stations of a WDM system it is necessary to select a particular channel and separate it from the others. This function is performed by what is commonly known as a channel dropping filter.

D. C. Johnson et al, *Electronic Letters*, Vol. 23, p. 668 (1987) have proposed such a filter or tap based upon the use of an optical grating in each of a pair of parallel optical fiber (or integrated-optic) arms disposed between a pair of 3 dB couplers. The fiber arms are supposed to be of equal length and the gratings are supposed to be in registration with one another so as to introduce no phase shift between different modes. In contrast, the 3 dB couplers themselves introduce a 90° phase shift. Consequently, as shown in FIG. 1 of the article, reflected light $\lambda_o$ traverses paths 1 and 2, undergoes constructive interference and exits port B. However, any light attempting to exit port A would experience destructive interference. This design is difficult to manufacture because the performance of this type of coupler is critically dependent on the length of the coupling region. If the length is not ideal, then the filter may exhibit undesirably high levels of back-reflected power and low levels of transmitted power. This problem is exacerbated if the filters are cascaded because the losses are cumulative.

R. C. Alferness et al, *Electronic Letters*, Vol. 24, No. 3. pp. 150-151 (1988) describe an integrated optic version of the Johnson filter implemented in InP/InGaAsP. They point out that careful alignment of the gratings is critical to insure equal path lengths over the two grating arms. Otherwise, some of the light at $\lambda_o$ will be reflected back into the incident waveguide (waveguide A of Johnson et al; upper left waveguide of Alferness et al).

Another problem associated with many optical transmission systems is wavelength dispersion; that is, systems which utilize a dispersive transmission medium, such as a standard 1.5 μm optical fiber, cause optical radiation of different wavelengths to travel at different velocities. Consequently, a digital pulse tends to spread out as it propagates, thereby limiting the bit rate of the digital system. While numerous techniques have been proposed for addressing dispersion, including the use of single frequency lasers and/or dispersion shifted fiber, the problem remains.

SUMMARY OF THE INVENTION

In accordance with one aspect of the invention, adiabatic reflection apparatus comprises a wavelength selective structure coupled to an adiabatic Y-coupler having single mode branches coupled to a multimode common section which supports both symmetric and anti-symmetric modes. One branch of the coupler converts guided light to a symmetric mode in the common section whereas the other branch converts guided light to an anti-symmetric mode in the common section. The wavelength selective structure includes at least two single mode optical waveguide arms, one end of each arm being coupled to the common section, and a reflection device (e.g., a grating) located in each arm. During reflection this structure converts guided light from a symmetric to an anti-symmetric mode and conversely.

In one embodiment of the invention for use in WDM systems, particularly those involving long haul transmission and plural optical amplification stages, it is desirable that the amplitude of the channel carriers be maintained relatively balanced. This function is performed by applying the WDM signal to one branch of the Y-coupler and by designing the wavelength selective structure to reflect guided light at the wavelengths of each channel carrier to be balanced. The amplitudes of these channel carriers are sensed at the output of the other branch of the same coupler and are compared to one another (or to some standard reference), and any difference is used to generate an error signal. The latter is fed back to control elements which shift the reflection wavelengths of selected reflection devices, thereby altering the amount of energy reflected versus the amount transmitted. This controllable attenuation of the channel carriers enables their amplitudes to be balanced at one or more points (e.g., amplifier stages) along the transmission path.

In another embodiment for use in a digital system with a dispersive transmission medium, a pulse to be reshaped is applied to one branch of the Y-coupler. The wavelength selective structure includes a plurality of reflection devices tuned to different wavelengths (e.g., chirped gratings) so as to compensate for the dispersion. The reflected pulse is thereby reshaped and exits the other branch of the Y-coupler. Alternatively, the process may be reversed by applying the pulse first to the compensator to pre-distort its shape and then applying it to the dispersive medium.

In yet another embodiment of the invention for operation as a channel dropping filter in a WDM system, a second adiabatic Y-coupler is coupled through a second common section to the other ends of the waveguide arms of the wavelength selective structure. A WDM symmetric mode signal is applied to one branch of one coupler, and the selective structure is designed to reflect guided light of wavelength $\lambda_T$, where $\lambda_T$ is the wavelength of the channel carrier to be selected in the channel dropping function. That channel carrier is reflected out through the anti-symmetric mode branch of the same coupler. The transmitted channel carriers, on the other hand, exit the symmetric mode branch of the other coupler.

Advantageously, the absence of a critical coupling length will make the invention more easily manufacturable, with lower attendant cost, than the prior art designs discussed above.

BRIEF DESCRIPTION OF THE DRAWING

The invention, together with its various features and advantages can be readily understood from the following more detailed description taken in conjunction with the accompanying drawing, in which.

DETAILED DESCRIPTION

Figure 1:
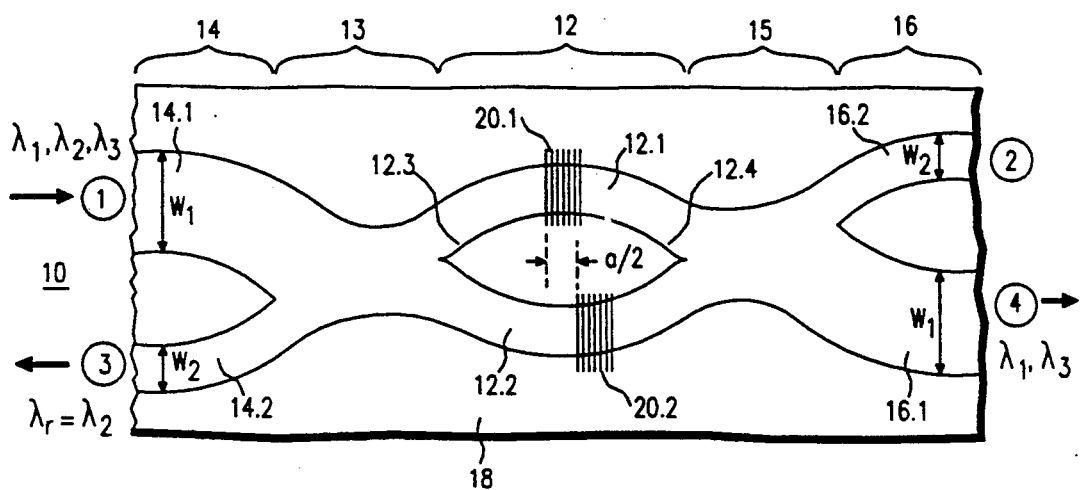
FIG. 1 is a schematic top view of one embodiment of an adiabatic reflection filter of the invention implemented in substrate-supported thin film waveguides with staggered optical gratings as the reflection devices.

Turning now to FIG. 1, there is shown an adiabatic reflection apparatus 10 comprising a wavelength selective structure 12 coupled to an adiabatic Y-coupler 14 having single mode branches 14.1 and 14.2 and a multimode common section 13.

Figure 6:
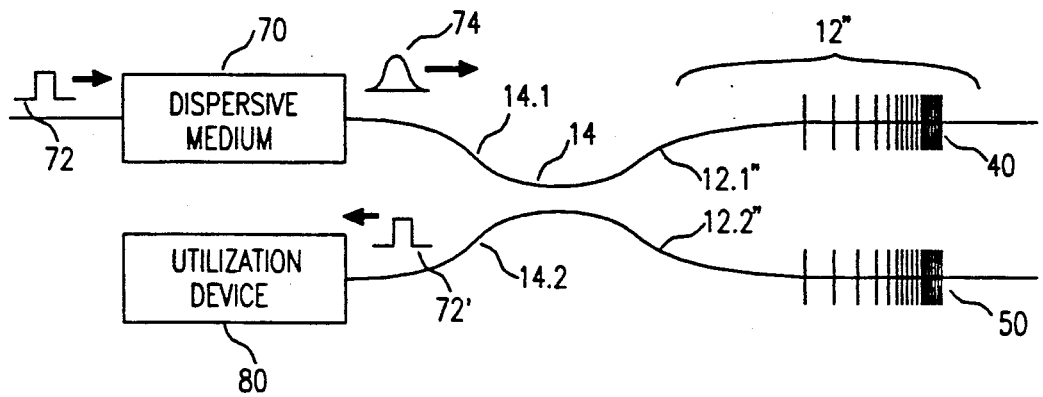
FIG. 6 is a schematic view of a dispersion compensator in accordance with another aspect of the invention.
Figure 5:
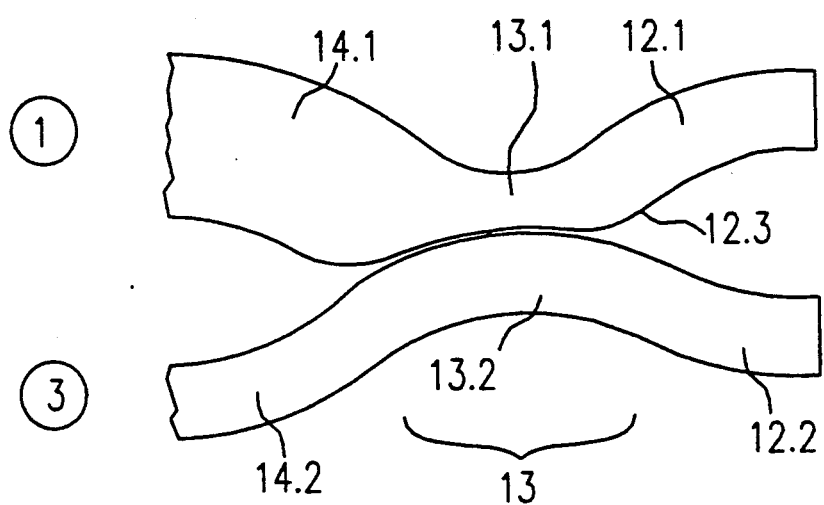
FIG. 5 is a schematic top view of a portion of an embodiment of the invention in which the common section comprises two physically separate, but optically coupled waveguides.

Variations of much of the apparatus of FIG. 1 are used in the dispersion compensator of FIG. 5 and the WDM channel balancer of FIG. 6. However, other applications, such as a WDM channel dropping filter, may also include a second adiabatic Y-coupler 16 having single mode branches 16.1 and 16.2 coupled to structure 12 via a second multimode common section 15.

The arrangements depicted illustrate implementation as substrate-supported thin film waveguides. A preferred mode of implementation utilizes silicon optical bench technology in which thin film silica waveguides are formed on a silicon substrate 18 as described by C. H. Henry and R. A. Levy in U. S. Pat. No. 4,902,086.

The coupler 14 and 16 are "adiabatic" in the sense defined in copending application Ser. No. 07/437049 (C. H. Henry et al 17-12-4, now U.S. Pat. No. 4,998,793, assigned to the assignee hereof and incorporated herein by reference. Briefly, a coupler is said to be adiabatic if the mode occupation (i.e., the energy in each mode) is conserved in passing through the coupler. To be adiabatic the transition in any waveguide parameter (e.g., width, thickness, refractive index) in passing through the coupler must be gradual, not abrupt. In an ideal adiabatic transition, any perturbation in a waveguide parameter is sufficiently gradual that no coupling occurs between optical modes having a difference in propagation constants $\Delta\beta$. What is "sufficiently gradual" is defined in terms of the beat length L between the modes, where L is proportional to $1/\Delta\beta$. To be adiabatic the changes (perturbations) should take place over a distance large compared to L. For example, in the branching waveguides of FIG. 1, at least the initial branching angle, where the waveguides are still optically coupled to one another, should be less than one degree. In FIG. 1 these angles are shown to be much larger in the interests of clarity of illustration.

In addition to being adiabatic, the couplers 14 and 16 are each designed so that waveguide branches 14.4, 16.1 convert guided light to a symmetric mode in the common sections 13 and 15, respectively, and the other branches 14.2, 16.2 convert guided light to an anti-symmetric mode in the common sections 13 and 15, respectively. One way to achieve this kind of mode conversion is to design waveguide branches 14.1, 16.1 to have higher effective refractive indices than waveguide branches 14.2, 16.2, which in turn is implemented in FIG. 1 by making waveguide branches 14.1, 16.1 wider than waveguide branches 14.2, 16.2 ($W_1 > W_2$). In this sense, couplers 14 and 16 can be said to be asymmetric.

Figure 4:
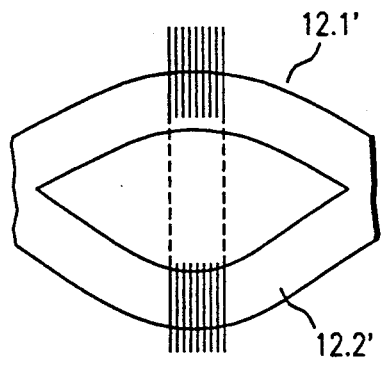
FIG. 4 is a schematic top view of a wavelength selective structure in which the gratings need not be staggered; instead waveguide arms of different lengths are used.

On the other hand, structure 12 includes a plurality, in this case two, of single mode waveguide arms 12.1 and 12.2 connected in parallel with one another via symmetric adiabatic couplers 12.3 and 12.4. Common sections 13 and 15, which couple symmetric couplers 12.3 and 12.4 to asymmetric couplers 14 and 16, respectively, support both symmetric and anti-symmetric modes. Structure 12 also includes reflection devices 20.1 and 20.2 located respectively in each arm and designed so that at least one predetermined wavelength $\lambda_T$ is reflected whereas other wavelengths are transmitted. Illustratively, the devices are optical gratings made preferably by the technique described by T. Jewell et al. (Case 1-27), application Ser. No. 07/224,52 filed on July 26, 1988, now U.S. Pat. No. 4,947,413, and assigned to the assignee hereof. In addition, the waveguide arms and the reflection devices are mutually adapted to convert reflected light at $\lambda_T$ from a symmetric mode to an anti-symmetric mode and conversely. To achieve this mode conversion the optical path lengths through arms 12.1 and 12.2 should differ by $\lambda_T/4$ or an odd multiple thereof, where $\lambda_T$ is the wavelength as measured in the waveguide. In FIG. 1 this quarter wavelength shift is implemented by using waveguide arms of the same physical length and by introducing a grating shift of a/2 (or an odd multiple thereof), where a is the grating period ($a = \lambda_T/2$ for first order Bragg reflection; that is, the gratings are displaced from one another by an axial distance (in the direction of light propagation) of about a/2. Once again, in FIG. 2 the displacement a/2 is exaggerated in the interests of clarity of illustration. Alternatively, as shown in FIG. 4, the gratings are unshifted and the physical length of waveguide arm 12.2' is made sufficiently longer (i.e., by a/2 or equivalently $\lambda_T/4$, or an odd multiple thereof) than that of arm 12.1' to introduce the desired phase shift.

Figure 2:
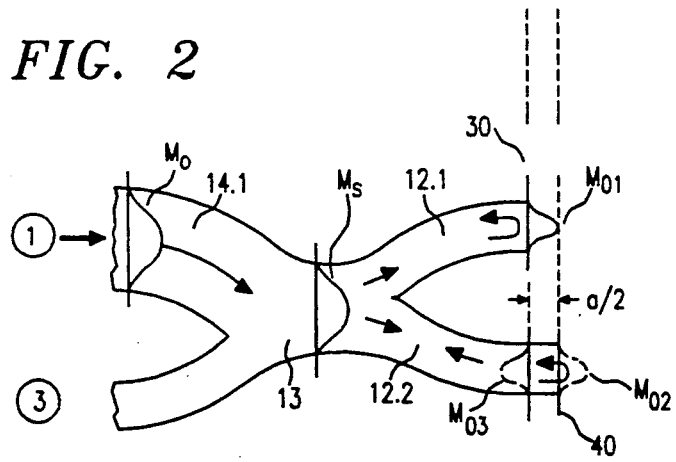
FIGS. 2-3 show portions of FIG. 1 used in explaining the relationship between the symmetric/anti-symmetric modes and the reflection characteristics of the gratings.
Figure 3:
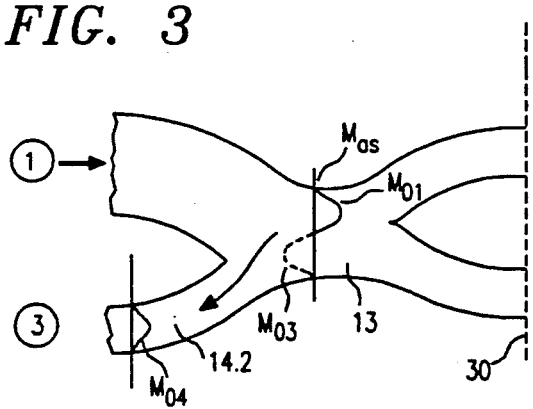

The common sections 13 and 15 of FIGS. 1-3 are shown as being single multimode waveguides. However, each of them is preferably constructed from physically separate, but optically coupled single mode waveguides. As shown in FIG. 5, common section 13 comprises two coupled single mode waveguides 13.1 and 13.2 which connect, respectively, waveguide branches 14.1, 14.2 to waveguide arms 12.1, 12.2. Illustratively, 4-7 $\mu$m wide cores of waveguides 13.1 and 13.2 are separated by about a 2 $\mu$m gap. One feature of this configuration is that branches 14.1, 14.2 adiabatically taper into waveguides 13.1, 13.2, and the latter are essentially identical to one another at least at the input to symmetric Y-coupler 12.3. Like the common section 13 of FIGS. 1-3, waveguides 13.1, 13.2 together support both symmetric and antisymmetric modes. We have found that, from a processing standpoint, this embodiment facilitates the fabrication of an adiabatic transition between the waveguide branches 14.1, 14.2 and common section 13.

In operation as a channel dropping filter, a WDM signal, having illustratively three channels with carriers designed $\lambda_1, \lambda_2, \lambda_3$ in FIG. 1, is applied to port 1 of adiabatic reflection apparatus 10. Gratings 20.1, 20.2 are designed to reflect guided light at $\lambda_T = \lambda_2$. The WDM signal excites the fundamental mode $M_o$ (FIG. 2) in single mode waveguide branch 14.1. This mode becomes a symmetric mode $M_S$ in common section 13. Upon entering structure 12, the mode $M_S$ splits into two fundamental modes $M_{o1}$ and $M_{o2}$ in single mode arms 12.1 and 12.2, respectively. Mode $M_{o1}$ is incident upon grating 20.1 at plane 30 which reflects $\lambda_2$ but transmits $\lambda_1$ and $\lambda_3$. In contrast, mode $M_{o2}$ is incident upon grating 20.2 at plane 40 which again reflects $\lambda_2$, but in doing so it propagates an additional distance of a/2 which corresponds to a quarter wave phase shift. After being reflected, the mode $M_{o2}$ at $\lambda_2$ propagates back yet another distance of a/2 in order to reach plane 30. Thus, mode $M_{o2}$ experiences a total of a half wave phase shift (180°) which is shown by the inverted mode $M_{o3}$ in FIG. 2. When these two reflected modes, $M_{o1}$ and $M_{o3}$, both at $\lambda_2$, combine in section 13, as shown in FIG. 3 they form anti-symmetric mode $M_{as}$ at $\lambda_2$ which propagates through single mode waveguide 14.2 and exits port 3 as fundamental mode $M_{o4}$. Channel carrier $\lambda_2$ is thereby effectively filtered out of the WDM signal. The other channel carriers are not reflected by the gratings and, therefore, continue through structure 12 to coupler 16 as symmetric mode signals. They both, therefore, exit port 4 via branch 16.1 which, as noted earlier, is a symmetric mode waveguide.

Where it is desired to separate a plurality of channels onto different output paths, a plurality of filters may be connected in tandem; for example, port 4 of a first filter would be coupled to port 1 of a downstream second filter. Port 2 of the first filter would carry one dropped channel, whereas port 2 of the second filter would carry the other dropped channel.

Another application of the invention is shown in FIG. 6 where a pulse 72 of a digital signal propagates through a dispersive medium 70 causing it to alter its shape (e.g., spread out) as shown by pulse 74. This broadening is due to the change in propagation time (delay $\tau$) with wavelength $d\tau/d\lambda$. To compensate for the effects of dispersion, the pulse 74 is applied to branch 14.1 of an adiabatic coupler 14 of the type described in conjunction with FIGS. 1-5. In this case, however, wavelength selective structure 12" includes chirped gratings 40 and 50 in arms 12.1" and 12.2", respectively. Alternatively, gratings 40 and 50 may comprise a plurality of discrete gratings each reflective at a different wavelength covering a range of wavelengths expected to exist in pulse 74 so as to approximate continuous chirping. The effect of the chirped gratings is to vary the delay occurring in Bragg reflection with wavelength $(-d\tau/d\lambda)$ which will cancel the $(+d\tau/d\lambda)$ caused by fiber dispersion. Either form of grating will be considered herein to be chirped, and in either case the grating period a varies by such a small amount (e.g., $10^{-3}$ from one end to the other of a chirped grating) over the desired wavelength range, that simply using a shift essentially equal to a to design the grating will suffice.

As with the filter previously described, the gratings and waveguide arms are designed to convert reflected light from a symmetric mode to an anti-symmetric mode and conversely. The chirped gratings reflected the various wavelength components of pulse 74 with different delays in such a way that essentially the original pulse shape 72' is recovered at branch 14.2 of coupler 14. Pulse 72' is applied to utilization device 80.

Note in this embodiment that only a single coupler 14 is necessary and waveguide arms 12.1" and 12.2" need not be terminated. Also, additional compensation may be had by coupling branch 14.2 to another compensation device of the type just described. Depending on system considerations, such as insertion loss and the required dispersion compensation, a plurality of compensators may thus be connected in tandem.

Although the embodiment of FIG. 6 positions the dispersion compensator after the dispersive medium 70, it is readily possible to position it before medium 70. In the latter case, the pulse shape is first altered (e.g., broadened by $-d\tau/d\lambda$) prior to entering medium 70 and then, after being further altered by medium 70 (e.g., compressed), the desired pulse shape is attained.

Figure 7:
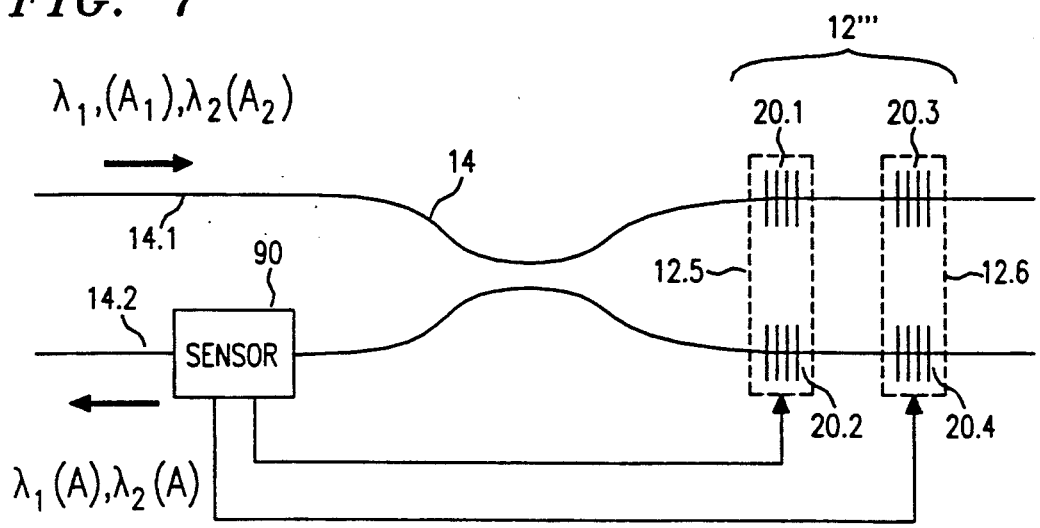
FIG. 7 is a schematic view of a channel balancing apparatus in accordance with still another aspect of the invention.

In some WDM systems, particularly those involving long haul transmission and plural amplifications stages, it is desirable that the amplitude of the channel carriers be maintained relatively equal (balanced). Although the channels may be designed to be balanced at the transmitter, any wavelength or polarization dependent components (e.g., connectors, isolators, amplifiers) can create an imbalance. As shown in FIG. 7, another embodiment of the invention balances the channels by applying the WDM signal $\lambda_1(A_1)$, $\lambda_2(A_2)$ to one branch 14.1 of asymmetric adiabatic coupler 14 and by designing the wavelength selective structure 12''' to reflect guide light at the wavelengths $\lambda_1$ and $\lambda_2$ of the carriers to be balanced. Only two channels $\lambda_1$ and $\lambda_2$ are depicted for simplicity, and these carriers amplitudes are designated $A_1$ and $A_2$, respectively. Structure 12 includes gratings 20.1, 20.2 which reflect at $\lambda_1$ and gratings 20.3, 20.4 which reflect at $\lambda_2$. In proximity to the gratings are elements 12.5 and 12.6, (illustratively thin film heating elements overlying the gratings) for altering the refractive index (and hence the reflection wavelength) of the gratings. Elements 12.5 and 12.6 are controlled by feedback signals derived from sensor means 90 (including any necessary electronic circuitry) which senses the amplitude of guided light in branch 14.2 of coupler 14.

In operation, carrier $\lambda_1(A_1)$ is reflected by gratings 20.1, 20.2 and carrier $\lambda_2(A_2)$ is reflected by gratings 20.3, 20.4, in the manner previously described in conjunction with FIGS. 1-4. The reflected signal $\lambda_1(A_1)$, $\lambda_2(A_2)$ exits through branch 14.2 where the difference, if any, between amplitudes $A_1$ and $A_2$ is sensed by sensor means 90. Any such difference causes sensor means 90 to generate an error signal which is fed back to elements 12.4 and 12.6 to alter the refractive index of the gratings. This change in turn alters the amount of energy at $\lambda_1$ relative to that at 80 2 which is reflected by the gratings versus that which is transmitted. This controllable attenuation of $\lambda_1$ or $\lambda_2$ or both continues until the two channels are balanced; i.e., until their amplitudes are essentially equal to A as depicted by the signals $\lambda_1(A)$, $\lambda_2(A)$ on branch 14.2. In a system having plural amplification stages, this balancing function could be performed at one or more of those stages.

Figure 8:
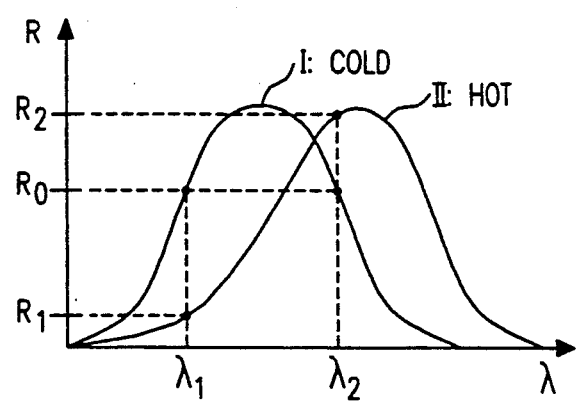
FIG. 8 shows the Bragg reflection curves used in describing how a single pair of gratings can be used to balance two channels of a WDM system.

Although the embodiment of FIG. 7 is, in the interests of simplicity, described in terms of a two channel WDM system, it is also applicable to more than two channels. However, the two-channel case is of particular interest because, where the two channel wavelengths are closely spaced (i.e., both fit under a single Bragg reflection curve), a single pair of gratings (e.g., 20.1, 20.2 of FIG. 6) may be utilized to balance the channels (i.e., gratings 20.3 and 20.4 of FIG. 6 need not be used). To understand how this is o, consider FIG. 8 which shows Bragg reflection R plotted against wavelength $\lambda$ for two cases: curve one labeled "cold" to signify that either no heat is generated by element 12.5 of FIG. 6 or less heat is generated by element 12.5 than for curve II of FIG. 7 which is labeled "hot". Note that heating the gratings causes curve II to shift to longer wavelengths.

Assume now that a WDM signal $\lambda_1(A_1)$, $\lambda_2(A_2)$ having channel carriers of different amplitudes $A_1 > A_2$ is applied to branch 14.1. These channels are positioned under curve I so that nominally each experiences the same amount of reflection $R_o$. To balance the channels $A_1$ and $A_2$ are made to be substantially equal to one another by heating element 12.5 and causing curve I to shift to longer wavelengths as illustrated by curve II. Now channel $\lambda_1(A_1)$ experiences lower reflection $R_1 > R_o$ to compensate for its higher amplitude, whereas channel $\lambda_2(A_2)$ experiences higher reflection $R_2 > R_o$ to compensate for its lower amplitude. Balance is achieved when the ratio of $A_1/A_2$ is made substantially equal to the ratio of $R_2/R_2$, with "substantial" being determined by system specifications.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the gratings of FIGS. 1-4 and 6 may be replaced with well-known resonant optical reflectors (RORs) of the type described for example, by R. Kazarinov et al in *IEEE Journal of Quantum Electronics*, 23, No. 9, p. 1419 (1987) and C. H. Henry et al in *IEEE Journal of Quantum Electronics*, 23, No. 9, p. 1426 (1987).

We claim:

1. A WDM system having a plurality of channels at different wavelengths, said system comprising
   first and second terminals for transmitting and/or receiving said channels,
   optical transmission means coupling said terminals to one another,
   at least one amplifier stage included in said transmission means, and
   adiabatic reflection apparatus included within said at least one amplifier stage, said apparatus comprising
   an adiabatic Y-coupler having a first single mode waveguide branch which converts guided light to a symmetric mode, a second single mode waveguide branch which converts guided light to an anti-symmetric mode, and a common multimode waveguide section where said first and second branches merge and which supports both symmetric and anti-symmetric modes, and
   a wavelength selective structure having one end coupled to said common section, said structure comprising at least two single mode waveguide arms coupled to said common section, and a reflection device disposed in each of said arms, said devices being designed to reflect guided light at at least one predetermined wavelength $\lambda_t$,
   said waveguide are and said reflection devices being designed to convert said reflected light to an anti-symmetric mode and conversely.

2. The system of claim 1 wherein
   said coupler is designed to receive said channels on said first branch, and
   said structure is designed to reflect guided light at a plurality of carrier wavelengths so that said reflected light exits said second branch, and further including
   means for sensing the amplitude of said reflected light and for generating an error signal related to the difference in amplitude between at least two of said carriers, and
   means responsive to said error signal for altering the reflection wavelengths of the reflection devices corresponding to said at least two carriers so as to balance their amplitudes.

3. A WDM system comprising
   first and second terminals for transmitting and/or receiving WDM channels,
   optical transmission means coupling said terminals to one another, and
   reflection filter apparatus included within at least one of said terminals for filtering out at least one of said channels having a carrier wavelength of $\lambda_T$, said apparatus comprising
   an adiabatic Y-coupler having a first single mode waveguide branch which converts guided light to a symmetric mode, a second single mode waveguide branch which converts guided light to an anti-symmetric mode, and a common multimode waveguide section where said first and second branches merge and which supports both symmetric and anti-symmetric modes, and
   a wavelength selective structure having one end coupled to said common section, said structure comprising at least two single mode waveguide arms coupled to said common section, and a reflection device disposed in each of said arms, said devices being designed to reflect guided light at at least one predetermined wavelength $\lambda_T$,
   said waveguide arms and said reflection devices being designed to convert said reflected light to an anti-symmetric mode and conversely
   a second adiabatic Y-coupler having a first single mode waveguide branch which converts guided light to a symmetric optical mode, a second single mode waveguide branch which converts guided light to an anti-symmetric optical mode, and a second common multimode waveguide section where said first and second branches merge and which supports both symmetric and anti-symmetric modes, and wherein
   another end of said wavelength selective structure is coupled to said second common section, and
   said waveguide arms and said reflection devices are designed so that guided light at $\lambda_T$ entering said first branch of said first coupler is reflected by said devices and exits said second branch of said first coupler, whereas guided light at wavelengths other than $\lambda_T$ is transmitted through said devices and exits said first branch of said second coupler.

4. The system of claim 3 including a plurality of said apparatuses arranged in tandem, each apparatus designed to reflect guided light at a different wavelength into a different output path.

* * * * *